United States Patent

Mori et al.

[11] Patent Number: 6,166,805
[45] Date of Patent: Dec. 26, 2000

[54] DOUBLE PASS MONOCHROMATOR

[75] Inventors: Tohru Mori; Tsutomu Kaneko; Manabu Kojima, all of Tokyo, Japan

[73] Assignee: Ando Electric Co., Ltd., Tokyo, Japan

[21] Appl. No.: 09/350,093

[22] Filed: Jul. 9, 1999

[30] Foreign Application Priority Data

Jul. 13, 1998 [JP] Japan .................................. 10-197881
Feb. 26, 1999 [JP] Japan .................................. 11-051944

[51] Int. Cl.[7] ...................................................... G01J 3/18
[52] U.S. Cl. ............................................................. 356/334
[58] Field of Search .................................. 356/331, 332, 356/333, 334

[56] References Cited

U.S. PATENT DOCUMENTS 2,922,331 1/1960 Fastie et al. .
3,888,590 6/1975 White ........................................ 356/333

FOREIGN PATENT DOCUMENTS 06221922 8/1994 Japan .

*Primary Examiner*—F. L. Evans
*Attorney, Agent, or Firm*—Burns Doane Swecker & Mathis L.L.P.

[57] ABSTRACT

The present invention relates to a double pass monochromator that improves wavelength resolution and reduces the actual length thereof. A return reflection means 7 that reverses the direction of dispersion of the wavelength of the second pass light 1c, 1f emitted and incident on a diffraction grating 4 during the reflection. In addition, the angles of the incident and emitted light during separation of spectral components by the diffraction grating are identical during the first and second diffraction.

9 Claims, 12 Drawing Sheets

FIG.10A
FIG.10B
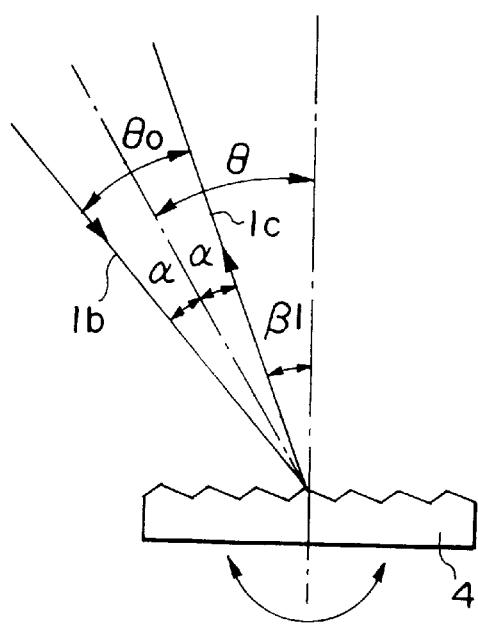
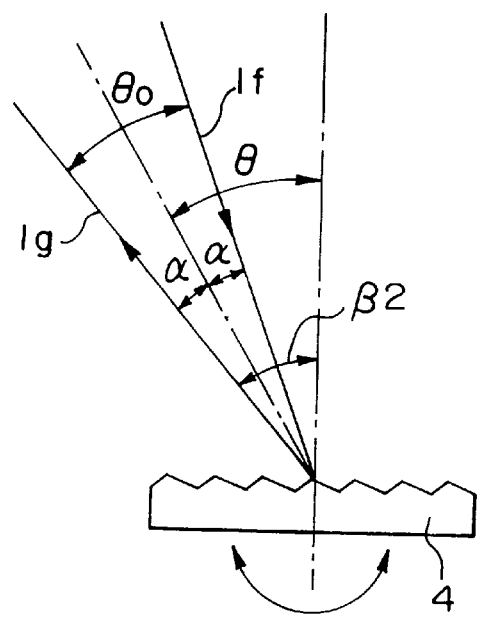

DOUBLE PASS MONOCHROMATOR

BACKGROUND OF THE INVENTION

1. Field of the Invention

The present invention relates to a double pass monochomator having an improved wavelength resolution.

This application is based on patent number Hei 10-197881 and Hei 11-051944 filed in Japan, the contents of which are incorporated herein by reference.

2. Description of the Related Art

FIG. 11 shows an example of the structure of a conventional double pass monochromator. The double pass monochromator shown in FIG. 11 comprises a light source 1, an entrance slit 2A, an exit slit 2B, middle slits 2C, 2D, concave mirrors 3, a diffraction grating 4, lenses 60, a return reflection means 7, and a photo detector 8. Moreover, in this conventional example, a rectangular prism 50 is used as the return reflection means 7. In the following explanation, FIG. 11 shows two concave mirrors 3, but this is for convenience of explanation, and in fact one concave mirror is satisfactory.

In this double pass monochromator, the light emitted from the light source 1 is diffracted by the same diffraction grating 4 two times, and is incident on the photo detector 8 as output light.

First Diffraction

In this double pass monochromator, a wide wavelength band source incident light 1a emitted from light source 1 transits the entrance slit 2A to be incident on the concave mirror 3. After being reflected by the concave mirror 3, this light is incident on the diffraction grating 4 as first pass incident light 1b, and is diffracted by the diffraction grating 4. At this time, the first pass incident light 1b is reflected at different angles with respect to the direction perpendicular (x-axis) to the grating on the diffraction grating surface depending on wavelength. In addition, among this first pass incident light 1b, the particular wavelength component determined by the angle of rotation of the diffraction grating 4, having an axis of rotation on the axis (y-axis) parallel to the grating, is incident on the concave mirror 3 as first pass emitted light 1c. Thereby, the first pass emitted light 1c is reflected by the concave mirror 3, and the wavelength component that transits the middle slit 2C among the reflected light transits the lens 60, and then is incident on the return reflection means 7 as return reflection means incident light 1d.

Second Diffraction

The return reflection means emitted light 1e reflected by this return reflection means 7 transits the lens 60, then the light that transits the middle slit 2D is incident on the concave mirror 3. The light reflected by the concave mirror 3 is incident again on the diffraction grating 4 as second pass incident light 1f, and is diffracted. At this time, the second pass incident light 1f is reflected at a different angle with respect to the x-axis depending on wavelength, and the particular wavelength component determined by the angle of rotation of the diffraction grating 4 is incident on the concave mirror 3 as second pass emitted light 1g. Thereby, the second pass emitted light 1g is reflected by the concave mirror 3, and the wavelength component that transits the exit slit 2B among this reflected light is incident on the photo detector 8 as output light 1h. Thereby, light of a narrow wavelength band can be obtained.

In the conventional double pass monochromator, the return reflection means 7 sometimes is structured with a combination of planar mirrors in place of a rectangular prism. One example of this is shown in FIG. 15. Moreover, the double pass monochromator shown in FIG. 15 uses one concave mirror. The double pass monochromator shown in FIG. 15 comprises a light source 1, ar entrance slit 2A, an exit slit 2B, a concave mirror 3, a diffraction grating 4, a planar mirror 6B, a return reflection means 7 which comprises a middle slit 2C and planar mirrors 6C, 6D, and a photo detector 8.

In this double pass monochromator, a wide wavelength band source incident light 1a emitted from light source 1 transits the entrance slit 2A to be incident on the concave mirror 3. After being reflected by the concave mirror 3, this light is incident on the diffraction grating 4 as first pass incident light 1b and is diffracted by the diffraction grating 4. At this time, the first pass incident light 1b is reflected at different angles with respect to the direction perpendicular (x-axis) to the grating on the diffraction grating surface 4 depending on wavelength. In addition, among this first pass incident light 1b, the particular wavelength component determined by the angle of rotation of the diffraction grating 4, having an axis of rotation on the axis (y-axis) parallel to the grating, is incident on the concave mirror 3 as first pass emitted light 1c, is reflected by the concave mirror 3, and is incident on the return reflection means 7 as return reflection means incident light 1d. In this conventional example, the return reflection means 7 comprises two planar mirrors 6C, 6D and the middle slit 2C.

The return reflection means incident light 1d reflected by this return reflection means 7 is reflected by the planar mirror 6C in the return reflection means 7, then the light that transits the middle slit 2C, and is reflected again by the planar mirror 6D. In addition, this reflected light is incident on the concave mirror 3 as return reflection means emitted light 1e, the light reflected by the concave mirror 3 is incident again on the diffraction grating 4 as second pass incident light 1f, and is diffracted. At this time, the second pass incident light 1f is reflected at a different angle with respect to the x-axis depending on wavelength, and the particular wavelength component determined by the angle of rotation of the diffraction grating 4 is incident on the concave mirror 3 as second pass emitted light 1g. In addition, after being reflected by the concave mirror 3, it is reflected by the planar mirror 6B, and among this reflected light, only the wavelength component that transits the exit slit 2B is incident on the photo detector 8 as output light 1h.

In the above-described double pass monochromator, in the case of the double pass monochromator having the structure shown, for example, in FIG. 11, in the return reflection means incident light 1d, the dispersion direction X of the wavelength of light, which is the direction of the spreading of the wavelength dispersed by the diffraction grating 4, in FIG. 12, as indicated by a broken arrow, is perpendicular to the y direction, which is the longitudinal direction of the slit hole 2c of the middle slit 2C. That is, in the width direction S of the slit 2c, the wavelength band is dispersed from short wavelength light P (e.g. purple light) to long wavelength light R (e.g. red light). Moreover, in FIG. 12, the arrow showing the dispersion direction X is pointing in the direction from the short wavelength to the long wavelength. This return reflection means incident light 1d, as is shown in FIG. 13, is incident on the return reflection means 7, and after being reflected two times by the rectangular prism 50, is emitted as return reflection means emitted light 1e. At this time, the dispersion direction X of the wavelength of light is not changed by the process of transiting the rectangular prism 50.

In addition, in the double pass monochromator shown in FIG. 15 as well, the return reflection means incident light 1d is incident on this return reflection means 7, and after being reflected two times by planar mirrors 6C, 6D, the dispersion direction X of the light is not changed by the process of being emitted as return reflection means emitted light 1e. Therefore, in the case of separating the special components of light by the conventional double pass monochromator, the directions of dispersion X of the light of the first pass emitted light 1c and the second pass incident light 1f are the same. That is, the diffraction grating 4 diffracts the light in the same dispersion direction X two times, and due to this point, there is a limit on wavelength resolution.

In addition, in these conventional double pass monochromators, because of the distance between the two reflection points in the rectangular prism 50 or the two planar mirrors 6C, 6D, which comprise the return reflection means 7, when separating the spectral components of the light on the diffraction grating 4, the angle changes between the first pass incident and emitted light and the second pass incident and emitted light with respect to the grating surface of the diffraction grating. In this situation, because the structure of the light path from the light source 1 to the light receiver 8 is complicated, it is necessary to make the angle of these two passes of incident and emitted light with respect to the grating surface substantially approximately identical by sufficiently extending the focal distance of the optical system in the monochromator, in particular the focal distance of the concave mirror 3. Because of this, there is the problem that the body of the double pass monochromator becomes long.

In addition, in the double pass monochromator, in order to obtain a sufficient dynamic range by eliminating stray light, precise adjustment of the slit widths of a plurality of slits introduced into the light path and the setting position is necessary. However, in the conventional double pass monochromator, when the diffraction grating is rotated in order to select the diffraction wavelength, it is necessary to adjust the slit system introduced in each course of the light path at this time, and there is the problem that the adjustment is complicated.

SUMMARY OF THE INVENTION

In order to solve the above-described problems, an object of the present invention is to provide a double pass monochromator in which it is possible to obtain a sufficient wavelength resolution, reduce the actual length of the double pass monochromator, obtain a good dynamic range, and in addition, simplify the adjustment of the slit system.

In order to obtain this object, in a double pass monochromator, after the source input light as first pass incident light is incident on the diffraction grating and the obtained first pass emitted light is reflected in a return reflection means, the light is again incident on this diffraction grating as second pass incident light, and only light having a specified wavelength is output as output light, and in the present invention, this return reflection means reverses the dispersion direction of the wavelength of light during the reflection in the return incident means.

That is, the dispersion direction of the wavelength of light incident on the return reflection means and the dispersion direction of the wavelength of light reflected by the return reflection means are reversed in this return reflection means.

Thereby, the diffraction grating can obtain a sufficient wavelength resolution because the light is diffracted two times in the variously differing dispersion directions of the wavelengths.

In addition, the above return reflection means reverses the dispersion direction of the wavelength of light during the reflection in this return reflection means, and at the same time, when the spectral components are separated by the diffraction grating, can make the angles of the incident and emitted light with respect to the grating surface of the diffraction grating identical during the first pass and second pass diffraction.

In addition, the above return reflection means reverses the dispersion direction of the wavelength of the light during the reflection in the return reflection means, and at the same time, can eliminate fluctuation in the direction perpendicular to the dispersion direction of the wavelength of light produced due to the rotation of the diffraction grating. Moreover, because fluctuation in the perpendicular direction is eliminated, the direction that is perpendicular to the dispersion direction of the wavelength of light can be made identical during the reflection in this return reflection means by this return reflection means.

In addition, the above return reflection means reverses the dispersion direction of the wavelength of the light during the reflection in this return reflection means, and at the same time, during the second pass through the monochromator, can eliminate the aberration of light produced during the first pass through the monochromator. Moreover, in order to eliminate the aberration of this light, the light can be reflected an odd number of times in the return reflection means.

Furthermore, the above return reflection means provides an optical means that converges the first pass emitted light from the diffraction grating, a middle slit that transits a specific wavelength component among the light converged by this optical means, a collimator lens that transforms the light that transited this middle slit into a parallel beam, and a plane mirror that reflects this parallel beam towards the diffraction grating via the collimator lens, and therein the optical axis of this collimator lens can be disposed so as to move parallel to the grating direction of the diffraction grating with respect to the center line of the first pass emitted light. In addition, the above planar mirror is preferably disposed on the optical axis of the collimator lens and on the focal position of the collimator lens.

Moreover, in the double pass monochromator of the present invention, the incident slit that restricts the source input light and the emitting slit that restricts the output light are preferably mounted independently.

BRIEF DESCRIPTION OF THE DRAWINGS

FIG. 10A and FIG. 10B are the drawings showing the reflection angle in the diffraction grating of the fifth embodiment.

DESCRIPTION OF THE PREFERRED EMBODIMENTS

Below, the present invention will be explained in detail referring to the reference figures. However, the present invention is not restricted to these embodiments.

First Embodiment

Figure 1:
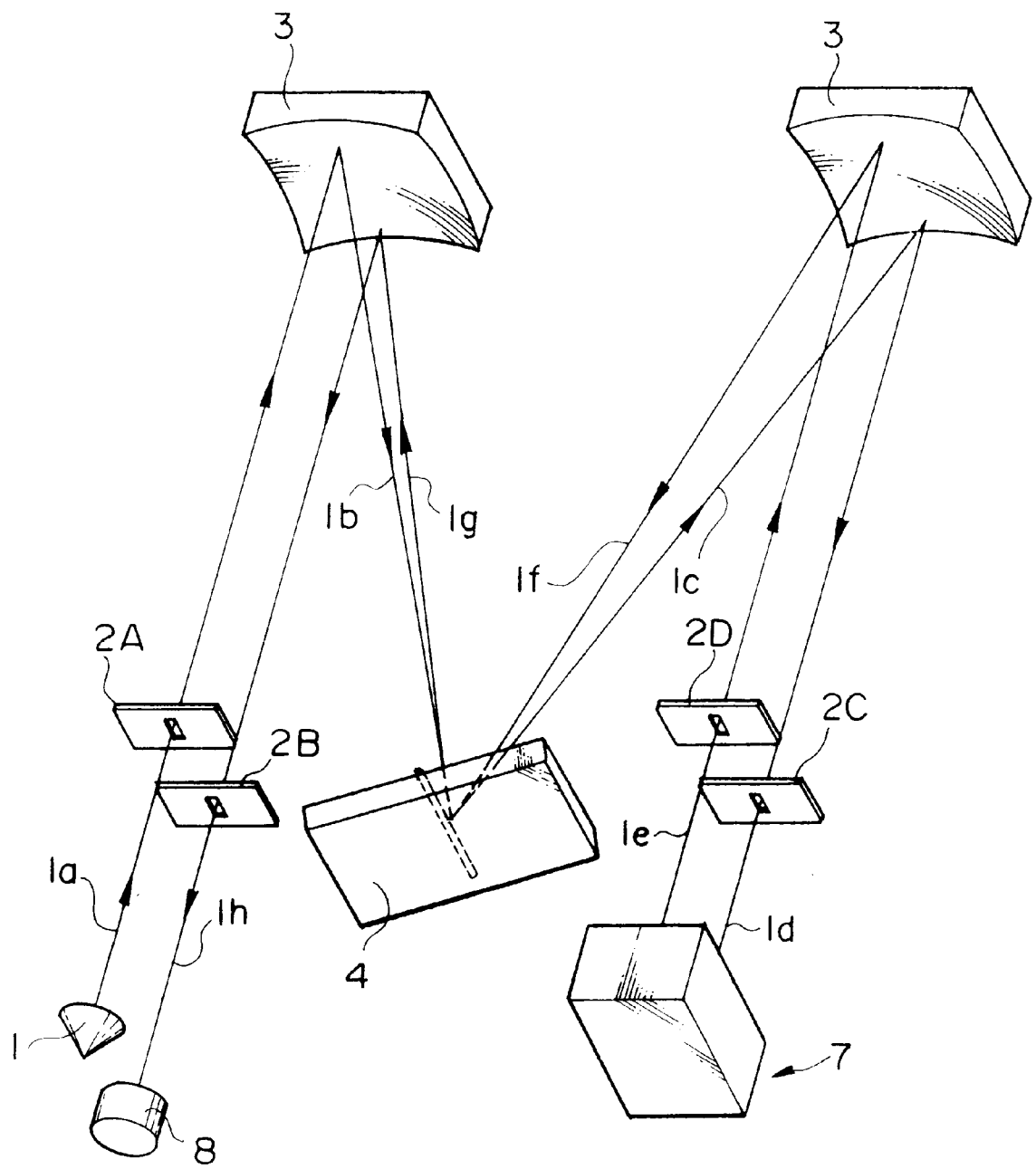
FIG. 1 is a drawing showing the structure of the first embodiment of the double pass monochromator of the present invention.

FIG. 1 is a drawing showing the structure of the double pass monochromator according to the first embodiment of the present invention. The double pass monochromator shown in FIG. 1 comprises a light source 1 that generates the light to be measured, an entrance slit 2A, an exit slit 2B, middle slits 2C, 2D, concave mirrors 3, a diffraction grating 4, a return reflection means 7, and a photo detector 8 that receives the light emitted from this double pass monochromator.

The double pass monochromator of the present embodiment differs from the conventional double pass monochromator in that the return reflection means 7 reverses the dispersion direction X of the wavelength of the light during the reflection. In this double pass monochromator, the return reflection means 7 is an optional means that allows reversing the dispersion direction X of the light.

In the double pass monochromator of this embodiment, the entrance slit 2A is an input slit provided between the light source 1 and the concave mirror 3. The exit slit 2B is provided between the concave mirror 3 and the photo detector 8, selects a particular wavelength from the second pass emitted light 1g, and thereby selects the separated wavelength component of the double pass monochromator.

In addition, the middle slits 2C, 2D select the diffraction wavelength in the second pass diffraction by being provided between the concave mirror 3 and the return reflection means 7.

The width and position of the slit hole of these entrance and exit slits 2A and 2B and the middle slits 2C and 2D are adjusted according to the wavelength resolution of the double pass monochromator and the dynamic range.

As a slit used by these entrance and exit slits 2A and 2B and the middle slits 2C and 2D, slits generally used in monochromators, etc., can be used without any special restrictions, and a flat slit, a switchable slit, or variable slit, etc., are preferable.

Figure 2:
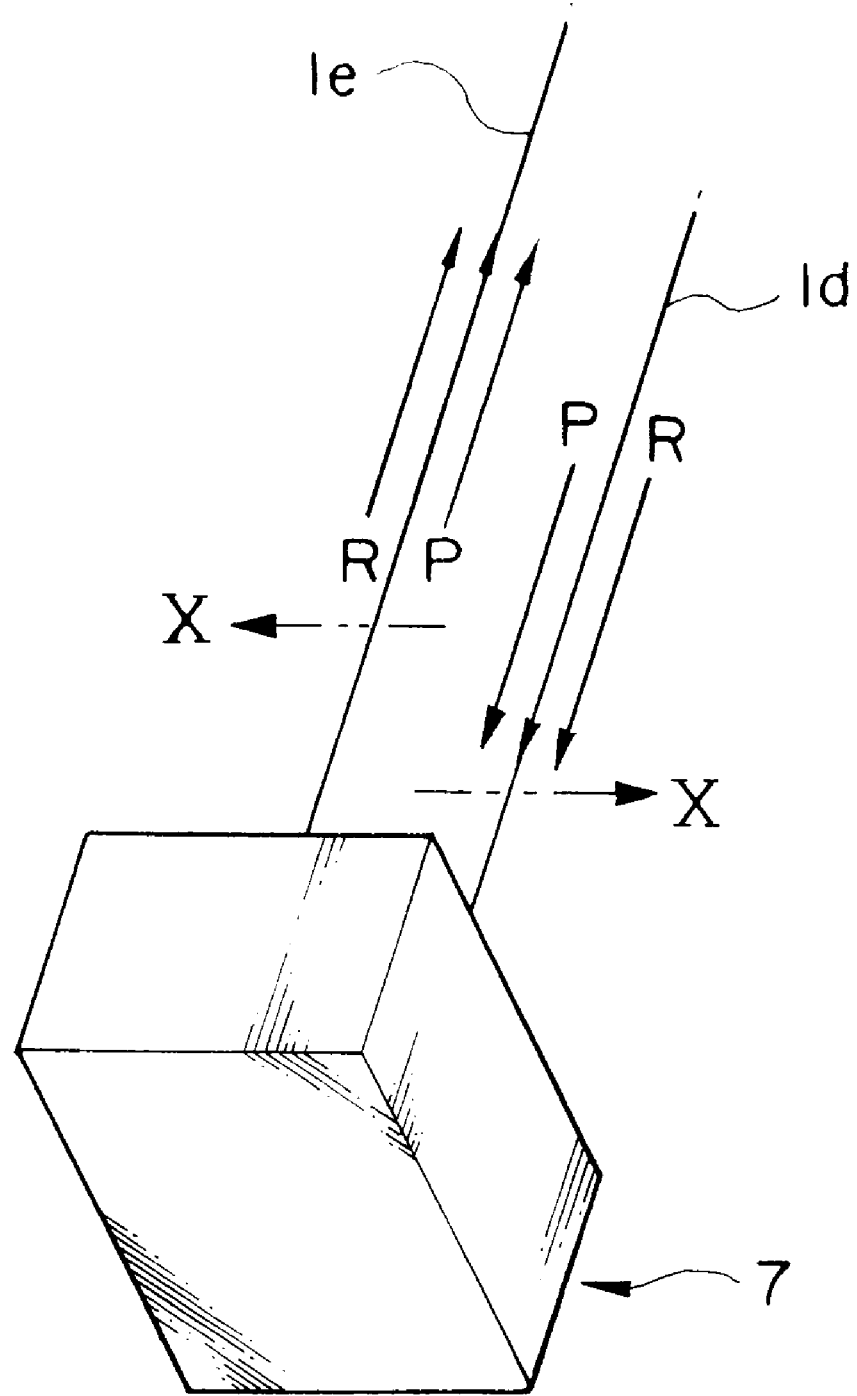
FIG. 2 is a drawing showing the dispersion direction of the wavelength of the return reflection incident light and the return reflection emitted light incident on the return light reflection means in the double pass monochromator in FIG. 1.

The light having an unknown spectrum separated into spectral components by the double pass monochromator of the present invention, like the conventional double pass monochromator, is emitted as output light 1h after being subject to a first and second diffraction, and input into a photo detector 8. The dispersion direction X of the return reflection means incident light 1d during separation of spectral components is determined by the diffraction grating 4 at the time of reflection by an angle that differs for each wavelength. The return reflection means incident light 1d has short wavelength light P that is dispersed in the direction of the short wavelengths and long wavelength light R that is dispersed in the direction of the long, wavelengths. When the dispersion direction X, as shown in FIG. 2, is in a state wherein long wavelengths R are on the right and the short wavelengths P are on the left when seen from the return reflection means 7, the return reflection means incident light 1d is incident on the return reflection means 7, and after being reflected, becomes the return reflection means emitted light 1e.

The positions of the short wavelength light P and the long wavelength light R of the return reflection means emitted light 1e obtained in this manner are disposed due to the diffraction grating 4 such that, when seen from the return reflection means 7, the short wavelength light P is on the right and the long wavelength light R is on the left, and thus the positional relationship of the short wavelength light P and the long wavelength light R of the return reflection means incident light 1d is reversed. That is, the dispersion direction X of the wavelength of the light is reversed during the reflection by the return reflection means 7.

In this type of double pass monochromator, because the return reflection means 7 that reverses the dispersion direction X of the light during the reflection is provided, when light is separated into spectral components, by reflecting on the return reflection means 7, the return reflection means incident light 1d becomes the return reflection means emitted light 1e having the dispersion direction X of the light reversed, and because the return reflection means emitted light 1e is diffracted further by the second pass of the monochromator, the wavelength resolution can be increased.

That is, in this double pass monochromator, because the dispersion direction X of the return reflection means incident light 1d and the return reflection means emitted light 1e reflected by the return reflection means 7 is reversed, the directions of dispersion X of the first pass emitted light 1c and the second pass incident light 1f are different. Because of this, the directions of dispersion X of the first pass emitted light 1c and the second pass incident light 1f, when seen from the diffraction grating 4, become reversed as the first pass emitted light 1c comes to be seen from a direction opposite that of the direction of progress.

Figure 14:
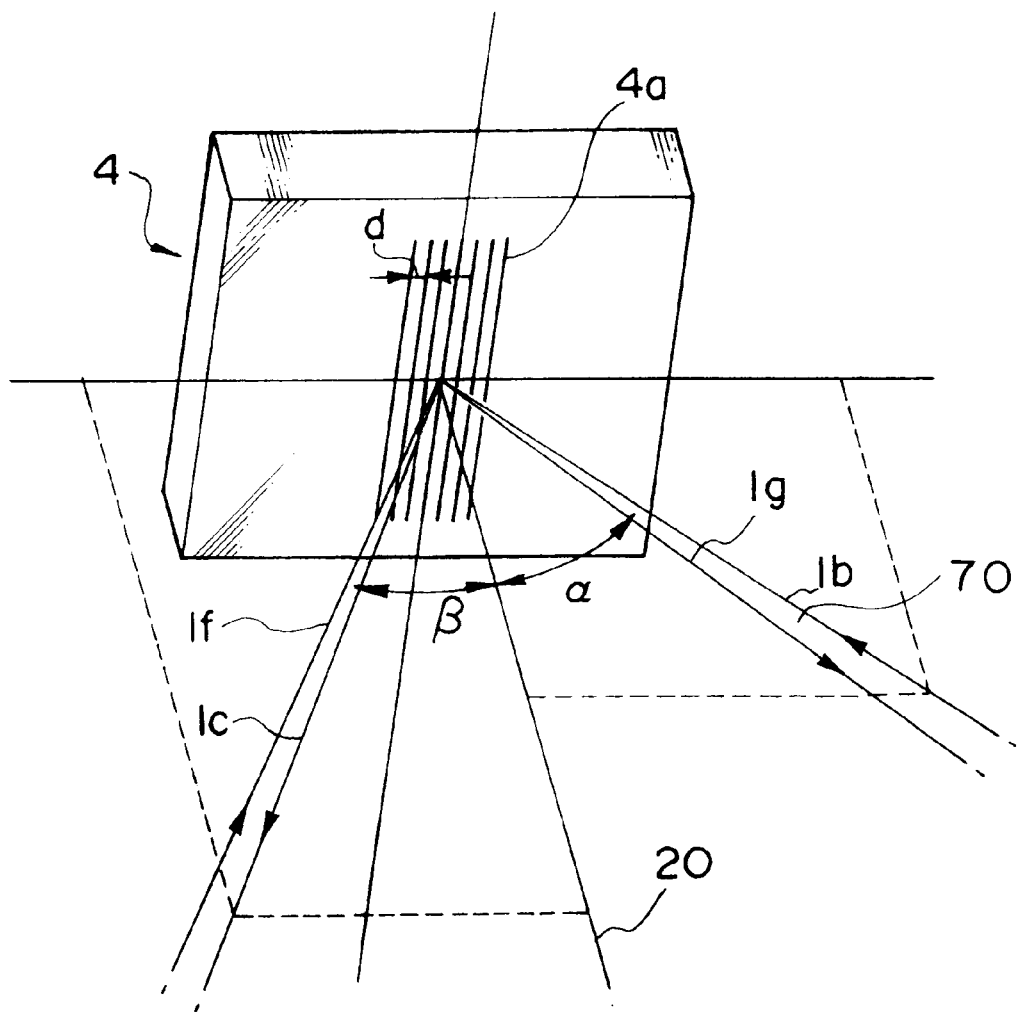
FIG. 14 is a perspective drawing showing an example of the state of the light dispersed by a diffraction grating.
Figure 15:
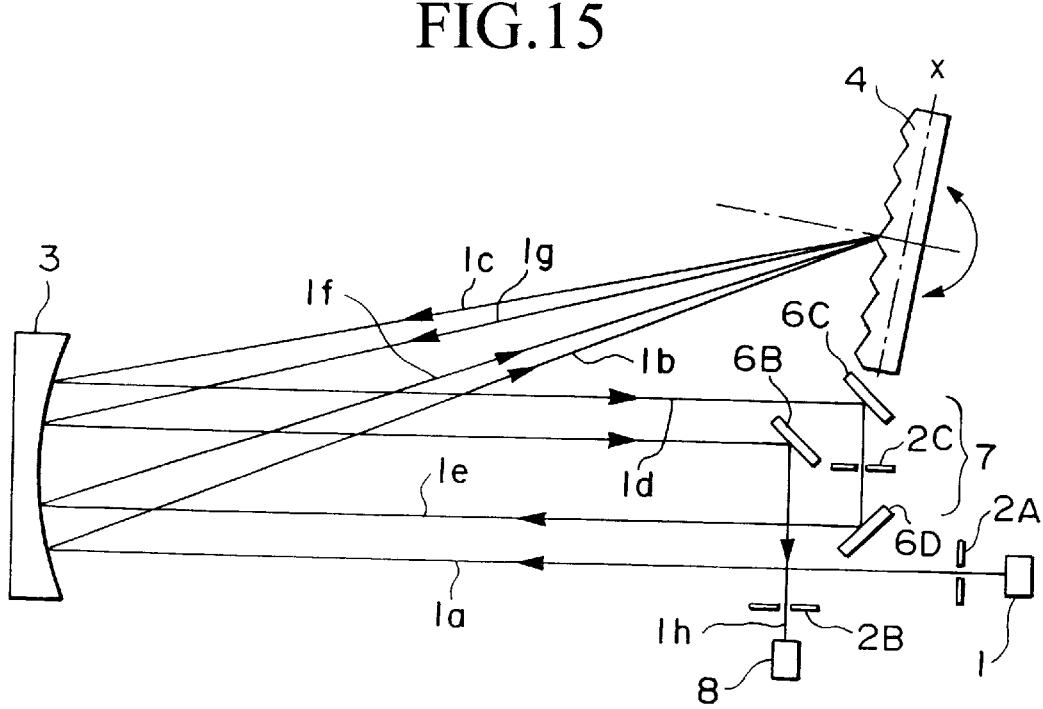
FIG. 15 is a drawing showing the structure of a conventional double pass monochromator different from that in FIG. 11.

When m is the diffraction order, f is the focal distance of the concave mirror 3, s is the width of the slit hole 2c of the exit slit 2B that emits the output light 1h, and as shown in FIG. 14, when d is the distance between the grooves 4a on the diffraction grating, and α is the angle between the surface 70 formed by the second pass emitted light 1g emitted from the diffraction grating 4 and the first pass incident light 1b and the normal line 20 with respect to the surface of the diffraction grating 4, then the wavelength resolution Δλ of this double pass monochromator is obtained from the following equation:

$$\Delta\lambda = (d/(2 \cdot m \cdot f)) \cdot S \cdot \cos \alpha \quad \text{(i)}.$$

When comparing the wavelength resolution of this double pass monochromator expressed by equation (i) and the resolution of a conventional double pass monochromator expressed by the following equation (ii), if the cos α in the above equation (i) is the same value as the cos β in equation (ii), the wavelength resolution of the present embodiment becomes ½ that of the conventional wavelength resolution.

$$\Delta\lambda = (d/(m \cdot f)) \cdot S \cdot \cos \beta \quad \text{(ii)}$$

That is, in this double pass monochromator, during separation into spectral components, because the dispersion direction X of the return refection means incident light 1d is reversed by the return reflection means 7, seen from the diffraction grating 4, the dispersion direction X of the first pass emitted light 1c and the second pass incident light 1f become opposite, and therefore, in the first pass and second pass diffraction, the angle reflected by the diffraction grating 4 is the same. Due to this, for example, when the value of cos α in the above equation (i) and the cos β in the above equation (ii) are identical, compared to the conventional double pass monochromator, it becomes a superior double pass monochromator with a wavelength resolution becoming ½.

Thereby, by reversing the dispersion direction X of the light by the return reflection means 7, it is possible to increase the wavelength resolution. In addition, the double pass monochromator of the present embodiment increases the wavelength selectivity by carrying out diffraction two times, and at the same time, it is possible to eliminate stray light by providing the middle slits 2C, 2D, and increase the dynamic range.

Second Embodiment

Figure 3:
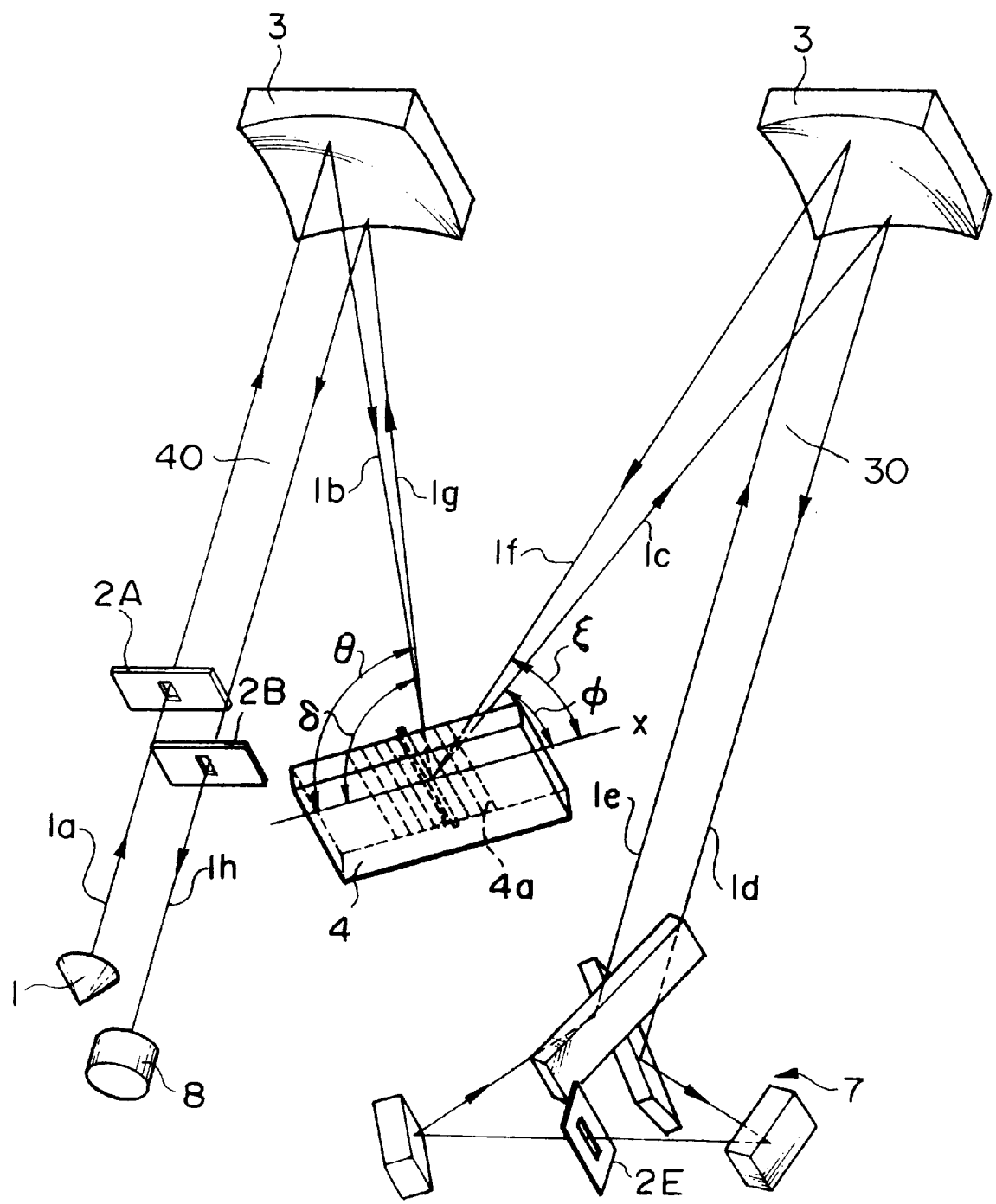
FIG. 3 is a figure showing the structure of the second embodiment of the double pass monochromator of the present invention.

FIG. 3 is a drawing showing the structure of the double pass monochromator according to the second embodiment. The double pass monochromator shown in FIG. 3 comprises a light source 1, an entrance slit 2A, an exit slit 2B, a concave mirror 3, a diffraction grating 4, a return reflection means 7, and a photo detector 8. In this double pass monochromator, the return reflection means 7 reverses the dispersion direction of the wavelength of light during the reflection, and at the same time the angle of the incident and emission light when separated into spectral components by the diffraction grating 4 is the same in the first and second diffraction. As the return reflection means 7 provided in this type of double pass monochromator, for example, as shown in FIG. 5, using a means comprising planar mirrors 9a, 9b, 9c, and 9d, which reflect the light, and the middle slit 2E is preferable.

The planar mirrors 9a, 9d according to the present embodiment, as shown in FIG. 3, are parallel to the return reflection means incident light 1d and the return reflection means emitted light 1e, and the surface 30 formed by the return reflection means incident light 1d and the return reflection means emitted light 1e is disposed so as to be parallel to the direction of the grooves 4a on the diffraction grating 4. In addition, the middle slit 2E is provided between the planar mirror 9b and the planar mirror 9c so as to have the same position as the focal position of the concave mirror 3. The light separated into spectral components by this double pass monochromator, like the double pass monochromator in the first embodiment shown in FIG. 1, is emitted as output light 1h after being subject to the first diffraction and the second diffraction, and input into the photo detector 8.

Figure 5:
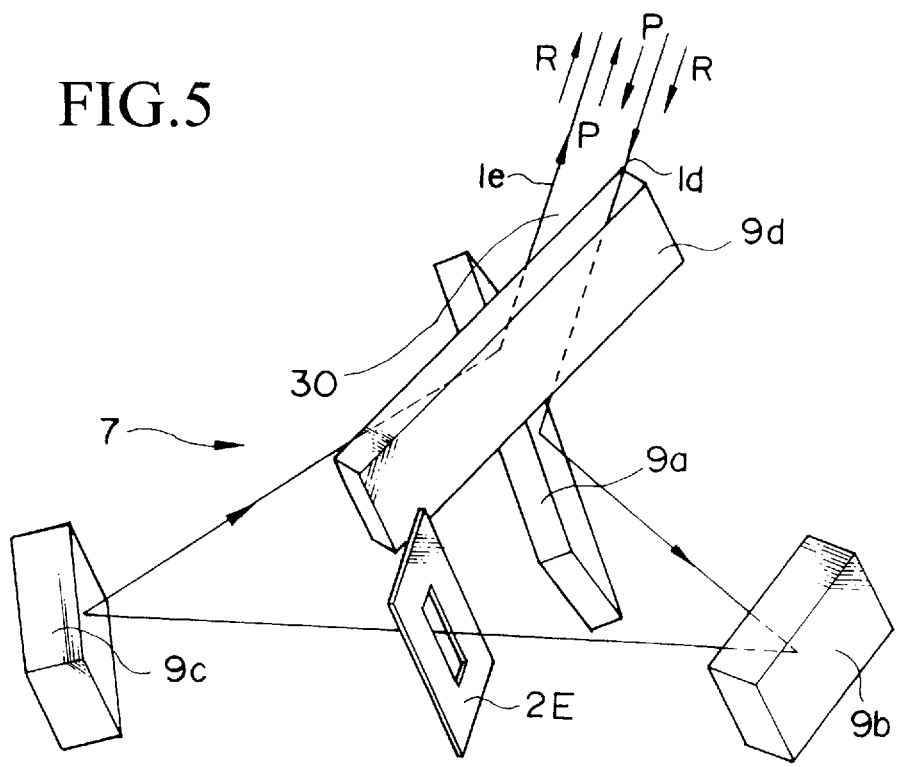
FIG. 5 is a drawing showing the return reflection means provided in the double pass monochromator shown in FIG. 3.

During this separation into spectral components, the return reflection means incident light 1d, as shown in FIG. 5, is incident on the return reflection means 7, and after being reflected by the planar mirror 9a and the planar mirror 9b, is incident on the middle slit 2E. Additionally, the wavelength of the light incident on the middle slit 2E is selected according to the wavelength resolution restricted by the width S of the slit hole 2c of the middle slit 2E, is reflected by the planar mirror 9d via the planar mirror 9c, and becomes the return reflection means emitted light 1e.

At this time, in this state the dispersion direction X of the wavelength of the return reflection means incident light 1d, as shown in FIG. 5, has the long wavelength light R on the right and the short wavelength light P on the left due to the dispersion grating 4, and is incident on the return reflection means 7. Additionally, after being reflected by the planar mirrors 9a, 9b, 9c, and 9d, it becomes the return reflection means emitted light 1e. Thereby, as shown in FIG. 5, the position of the short wavelength light P and the long wavelength light R of the obtained return reflection means emitted light 1e has the short wavelength light P on the right and the long wavelength light R on the left, and thus the state of the positional relationship of the short wavelength light P and the long wavelength light R of the return reflection means incident light 1d is reversed. That is, the dispersion direction X of the wavelength of the light, seen from the elongated surface of surface 30 formed by the return reflection means incident light 1d and the return reflection means emitted light 1e, is reversed during the reflection by the return reflection means 7.

In addition, during the separation into spectral components by this double pass monochromator, the return reflection means emitted light 1e becomes parallel to the return reflection means incident light 1d due to the return reflection means 7, and the surface 30 formed by the return reflection means incident light 1d and the return reflection means emitted light 1e is reversed in a direction parallel to the direction of the grooves 4a of the diffraction grating 4.

This type of double pass monochromator reverses the dispersion direction X of the wavelength of light during the reflection, and the return reflection means emitted light 1e is made parallel to the return reflection means incident light 1d. At the same time, because the double pass monochromator is provided with the return reflection means 7 that reflects the return reflection means incident light 1d so that the direction of the surface 30 is parallel the direction of the grooves 4a of the diffraction grating 4, during separation of spectral components, it is possible to increase the wavelength resolution, and in addition has the following effects:

(1) It is possible to replace by one slit both the entrance slit 2A that passes the source incident light 1a and the exit slit 2B that passes the second pass emitted light 1g via the concave mirror 3, and (2) The aberration of the concave mirror 3 can be ameliorated.

That is, in the separation of spectral components by this double pass monochromator, the return reflection means emitted light 1e from the return reflection means 7 is reflected so as to be parallel to the return reflection means incident light 1d, and in the direction in which the surface 30 is parallel to the direction of the grooves 4a on the diffraction grating 4. Thereby, no matter what angle the diffraction grating 4 is set, as shown in FIG. 3, the emission angle φ of the first pass emitted light 1c output from the diffraction grating 4 with respect to the diffraction grating 4 and the angle of incidence ξ of the second pass incident light output from the diffraction grating 4 with respect to the diffraction grating 4 are identical. Furthermore, the first pass and second pass diffraction are diffracted by the same diffraction grating 4, and thus the incidence angle δ of the first pass incident light 1b with respect to the diffraction grating and the emission angle θ of the second pass emitted light 1g with respect to the diffraction grating 4 are also identical.

Figure 4:
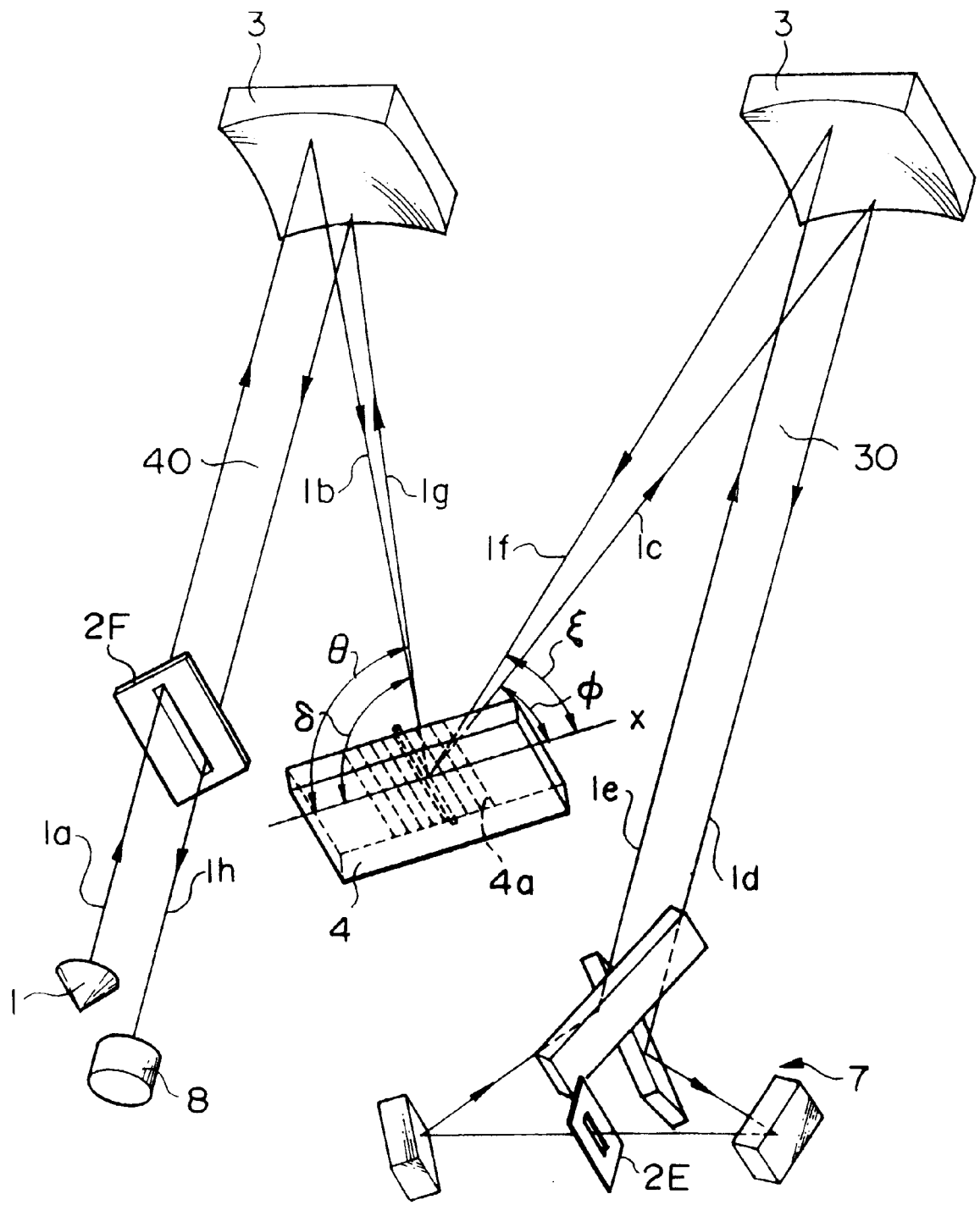
FIG. 4 is a drawing showing an alternative structure for the second embodiment of the double pass monochromator of the present invention.

Therefore, the first pass incident light 1b and the second pass emitted light 1g are parallel, and the surface 40 formed by the first pass incident light 1b after reflection by the concave mirror 3 and the second pass emitted light 1g is parallel to the direction of the grooves 4a on the diffraction grating 4, and thus, as with other examples of structures in the second embodiment shown in FIG. 4, in place of the entrance slit 2A that passes the source incident light 1a and the exit slit 2B that passes the second pass emitted light 1g via the concave mirror 3, an entrance-exit slit 2F that transits both the source incident light 1a and the output light 1h through one slit hole can be used.

In addition, in the double pass monochromator show in FIG. 4, the angles of the incident and emission light diffracted by the diffraction grating 4 become parallel in the first pass and second pass diffraction due to the return reflection means 7, and thus the angles of the incident and emission light with respect to the concave mirror 3 are also identical in the first and second pass diffraction. Thereby, it is possible to minimize the aberration of the concave mirror 3.

Third Embodiment

Figure 6:
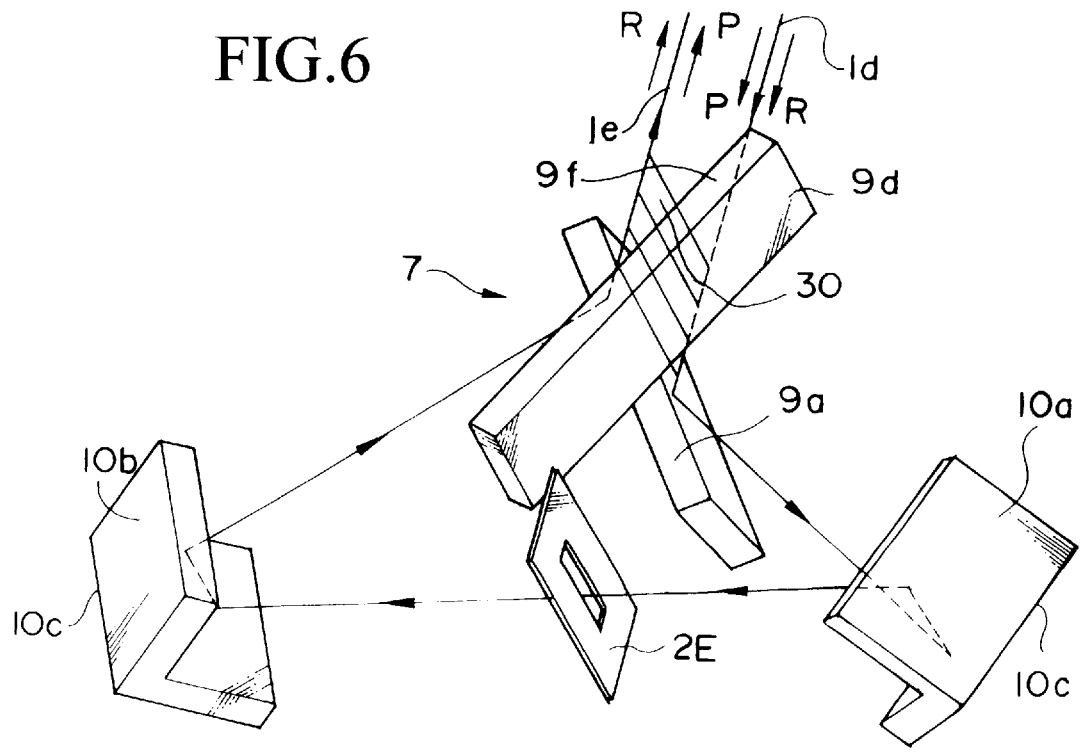
FIG. 6 is a drawing showing the return reflection means provided in the double pass monochromator of the third embodiment.

This embodiment of a double pass monochromator provides the return reflection means 7 shown in FIG. 6 in the double pass monochromator of the second embodiment shown in FIG. 3 and FIG. 4. The return reflection means 7 of this double pass monochromator reverses the dispersion direction of the wavelength of light during the reflection, and at the same time eliminates fluctuation in the direction perpendicular to the dispersion direction of the light generated when the diffraction grating 4 is rotating. As the return reflection means 7 provided in this type of double pass monochromator, it is preferable, for example, to use the return reflection means 7 having a structure such as that shown in FIG. 6. The return reflection means 7 shown in FIG. 6 comprises the planar mirrors 9e, 9f, the reflectors 10a, 10b, and the middle slit 2E.

Here, the planar mirrors 9a, 9d, are disposed so that the return reflection means incident light 1d and the return reflection means emitted light 1e are parallel, and furthermore, so that the surface 30 formed by the return reflection means incident light 1d and return reflection means emitted light 1e is parallel to the direction of the grooves 4a on the diffraction grating 4. In addition, the middle slit 2E is provided between the reflector 10a and the reflector 10b so as to be disposed at the same position as the focal position of the concave mirror 3. In addition, it is preferable that the parts 10c of the reflectors 10a, 10b, where the two reflection surfaces of the reflectors 10a, 10b are in contact, be positioned so as to be parallel to the dispersion direction X of the incident light.

In the separation of the spectral components by the double pass monochromator provided with this type of return reflection means 7, the return reflection means incident light 1d incident on the return reflection means 7 is incident on the middle slit 2E after being reflected by the planar mirror 9d and the reflector 10a, as shown in FIG. 6. In addition, the light incident on the middle slit 2E is reflected by the planar mirror 9f via the reflector 10b after the wavelength selection at the wavelength resolution restricted by the width of the slit hole, and becomes the return reflection means emitted light 1e.

At this time, the dispersion direction X of the wavelength of the return reflection means emitted light 1e incident on the return reflection means 7 has the short wavelength light R on the right and the long wavelength light P on the left due to the diffraction grating 4, and after being reflected by the planar mirror 9e, the reflector 10a, the reflector 10b, and the planar mirror 9f, becomes the return reflection means emitted light 1e. In addition, the position of the long wavelength light P and the short wavelength light R of the obtained return reflection means emitted light 1e, as shown in FIG. 6, have the long wavelength light P on the right and the short wavelength light R on the left, thus reversing the state of the positional relationships of the long wavelength light P and the short wavelengths R of the return reflection means incident light 1d. That is, the dispersion direction X of the wavelengths of light, seen from the extended surface of surface 30 formed by the return reflection means incident light 1d and the return reflection means emitted light 1e, is reversed during the reflection by the return reflection means 7.

In addition, the Y direction component, perpendicular to the dispersion direction X of the wavelengths, of the return reflection means incident light 1d incident on the return reflection means 7 is reversed by the reflector 10a after being reflected by the planar mirror 9e, and furthermore, this Y direction component is reversed by the reflector 10b. That is, in the case that the Y direction component of the return reflection means incident light 1d is, for example, shifted upwards, the return reflection means emitted light 1e emitted from the return reflection means 7 is also shifted upwards and emitted. Therefore, the Y direction component of the obtained return reflection means emitted light 1e is identical to that of the return reflection means incident light 1d.

Furthermore, the return reflection means emitted light 1e is reflected so as to be parallel to the return reflection means incident light 1d, and in the direction in which surface 30 formed by the return reflection means incident light 1d and the return reflection means emitted light 1e is parallel to the grooves 4a of the diffraction grating 4.

This type of double pass monochromator is preferably used, for example, in the case that during the separation into spectral components, the light is incident on the diffraction grating 4 having a shifted angle of elevation due to being rotated, or in the case that when making the second pass emitted light 1g incident via the concave mirror 3 on the entrance slit 2A, on which the source incident light 1a is incident, the fluctuation in the Y direction, which is the length direction of the slit hole 2c of this entrance slit 2A, must particularly be reduced.

In this type of double pass monochromator, because the return reflection means 7 is provided with two reflectors 10a, 10b disposed so that the part 10c at which the two reflecting surfaces are in contact is parallel to the dispersion direction X of the incident light to the return reflection means 7, during separation of the spectral components, the Y direction component of the return reflection means incident light 1d is reversed by the reflector 10a of the return reflection means 7, and furthermore, it is reversed by the reflector 10b. Thereby, as a result the return reflection means emitted light 1e having a Y direction component identical to that of the return reflection means incident light 1d is obtained, and it is possible to eliminate the shifting of the Y direction component in the photo detector 8.

For example, in the case that the Y direction component of the return reflection means incident light 1*d* is shifted because the light incident on the diffraction grating 4 is reflected off the diffraction grating 4 having a shifted angle of elevation, the Y direction component of the return reflection means emitted light 1*e* is made identical to the return reflection means incident light 1*d* by the return reflection means 7. Thereby, because the fluctuation of the component in the Y direction is eliminated, the second pass emitted light 1*g* does not have any shifting in the Y direction component. In addition, when the second pass emitted light 1*g* is incident on the entrance slit 2A via the concave mirror 3, on which the source incident light 1*a* is incident, it is possible to reduce the fluctuation in the Y direction, which is the length direction of the slit hole 2*c* of the entrance slit 2A, and furthermore, it is possible to eliminate fluctuation of the Y direction component in the photo detector 8.

Furthermore, in this type of double pass monochromator, in the case, for example, that the Y direction component of the return reflection means incident light 1*d* fluctuates upwards, there is no downward shifting of the Y direction component of the return reflection means emitted light 1*e* as there is when using a rectangular prism 50 as the return reflection means 7, and no fluctuation of the Y direction component in the photo detector 8, and therefore, the adjustment of the point of observing the photo detector 8 that due to the positional fluctuation of the photo detector 8 can be made unnecessary.

Thus, a superior double pass monochromator can be made because the return reflection means 7 eliminates the fluctuation in the direction perpendicular to the dispersion direction of the light.

Fourth Embodiment

Figure 7:
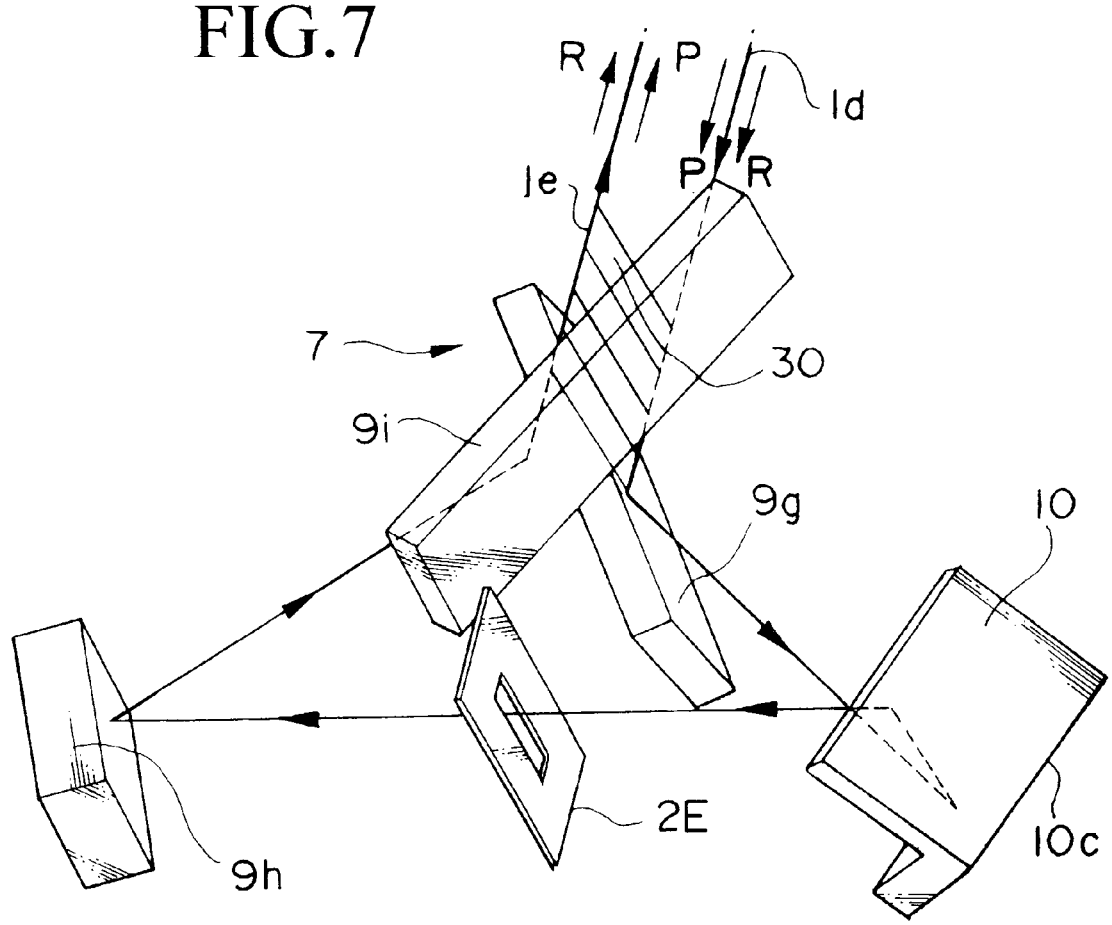
FIG. 7 is a drawing showing the return reflection means provided in the double pass monochromator in the fourth embodiment.

The double pass monochromator of the present embodiment is a double pass monochromator providing the return reflection means 7 shown in FIG. 7 on the double pass monochromator of the second embodiment shown in FIG. 3 and FIG. 4. In this double pass monochromator, the return reflection means 7 reverses the dispersion direction of the wavelength of light during reflection, and at the same time, the aberration of light produced during the first transit of the monochromator (the first diffraction) is eliminated during the second transit of the monochromator (the second diffraction). Using the return reflection means 7 having, for example, the structure shown in FIG. 7 as the return reflection means 7 that is provided on this type of double pass monochromator is preferable. The return reflection means 7 shown in FIG. 7 comprises planar mirrors 9*g*, 9*h*, 9*i*, the reflector 10, and the middle slit 2E.

Here, the planar mirrors 9*g*, 9*i* are disposed so that the return reflection means incident light 1*d* and the return reflection means emitted light 1*e* are parallel, and furthermore in the direction in which the surface 30 formed by the return reflection means incident light 1*d* and the return reflection means emitted light 1*e* is parallel to the direction of the grooves 4*a* on the diffraction grating 4. In addition, the middle slit 2E is provided between the reflector 10 and the planar mirror 9*h* so as to be disposed at the same position as the focal position of the concave mirror 3. In addition, it is preferable that the part 10*c* where the two reflecting surfaces of the reflector 10 is in contact be disposed so as to be parallel to the dispersion direction X of the incident light.

In the separation of spectral components by the double pass monochromator provided with this type of return reflection means 7, the return Reflection means incident light 1*d* incident on the return reflection means 7, as shown in FIG. 7, is incident on the middle slit 2E after being reflected by the planar mirror 9*g* and the reflector 10. The wavelength of the light selected according to the wavelength resolution restricted by the width of the slit hole of the middle slit 2E is subsequently reflected by the planar mirror 9*i* via the planar mirror 9*h*, and becomes the return reflection means emitted light 1*e*.

At this time, the dispersion direction X of the wavelength of the return reflection means incident light 1*d* incident on the return reflection means 7, as shown in FIG. 7, has the long wavelength light R on the right and the short wavelength light P on the left due to the diffraction grating 4, and after being reflected by the reflector 10, the planar mirror 9*h*, and the planar mirror 9*i*, becomes the return reflection means emitted light 1*e*. In addition, the position of the short wavelength light P and the long wavelength light R of the obtained return reflection emitted light 1*e*, as shown in FIG. 7, have the short wavelength light P on the right and the long wavelength light R on the left, thus reversing the state of the positional relationship of the short wavelength light P and the long wavelength light R of the return reflection means incident light 1*d*. That is, the dispersion direction X of the wavelengths of light, seen from the extended surface of surface 30 formed by the return reflection means incident light 1*d* and the return reflection means emitted light 1*e*, is reversed during the reflection by the return reflection means 7.

In addition, the return reflection means incident light 1*d* is reflected an odd number of times in the return reflection means 7, and becomes the return reflection means emitted light 1*e*. Furthermore, the return reflection means emitted light 1*e* is reflected so as to be parallel to the return reflection means incident light 1*d*, and in the direction in which the surface 30 is parallel to the direction of the grooves 4*a* on the diffraction grating 4.

In this type of double pass monochromator, because the number of reflection surfaces in the return reflection means 7 is odd, during separation of spectral components, the direction of the aberration is reversed by the return reflection means 7, and the image of the light formed at the position of the exit slit 2B is not blurred by the aberration while transiting via the concave mirror 3. Thereby, the wavelength resolution does not deteriorate, and there is no augmenting of the aberration produced by the first diffraction and the aberration produced by the second diffraction, as happens when the number of reflection surfaces is even.

Thereby, in this double pass monochromator, the return reflection means 7 eliminates the aberration of the light produced in the first transit of the monochromator (the first diffraction) during the second transit of the monochromator (the second diffraction), and thus, a superior double pass monochromator that can prevent blurring of the image of the light in the exit slit 2B and realize a high wavelength resolution is produced.

Moreover, in the double pass monochromator of the present embodiment, it is possible to provide respectively, as in the structure shown in FIG. 1, the entrance slit 2A between the light source 1 and the concave mirror 3, the middle slits 2C, 2D between the concave mirror 3 and the return reflection means 7, and the exit slit 2B between the concave mirror 3 and the photo detector 8, and if the desired dynamic range can be achieved, the number and position of these slits is not particularly restricted. In addition, in the double pass monochromator of the present embodiment, it is possible to provide two concave mirrors 3, as in the structure shown in FIG. 1, but it is also possible to use lenses instead of these concave mirrors 3. Furthermore, in the double pass monochromator of the present embodiment, according to necessity, by providing lenses at necessary positions, it is possible to produce an even more preferable double pass monochromator.

Furthermore, in the double pass monochromator of the present invention, during separation of spectral components, it is possible to make the light incident on the return reflection means 7 in the direction of progress of the light as shown in the examples described above, but it is also possible to make the light incident from the opposite direction, and there is no special restriction. In addition, in the double pass monochromator of the present embodiment, as in the structures shown in FIG. 5, FIG. 6, and FIG. 7, it is possible to provide a means to reflect light only on a planar mirror 9, or a means for reflecting light on planar mirror 9 and reflector 10, but as when using these return reflection emission means 7, if it is possible to reflect the return reflection means incident light 1d as the return reflection means emitted light 1e, it is possible to use a planar mirror 9, a reflector 10, a prism, or a combination of these instead of the planar mirror 9 and the reflector 10. Furthermore, if the number of reflection surfaces in the return reflection means 7 is odd, the number can be changed according to necessity, and is not particularly restricted.

Fifth Embodiment

Figure 8:
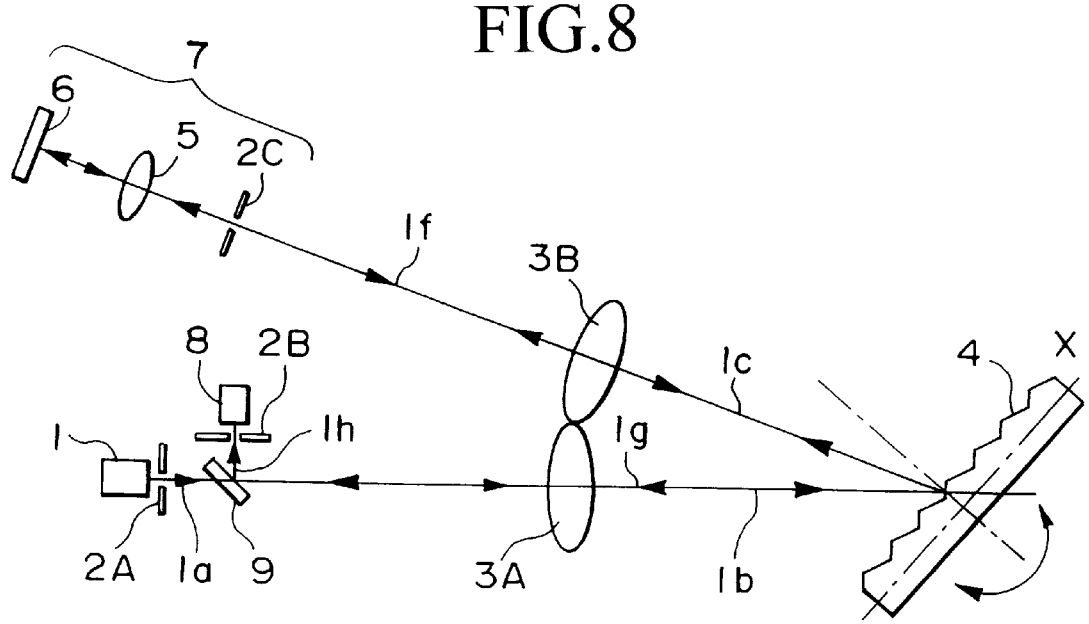
FIG. 8 is a drawing showing the structure of the fifth embodiment of the double pass monochromator of the present invention.
Figure 9:
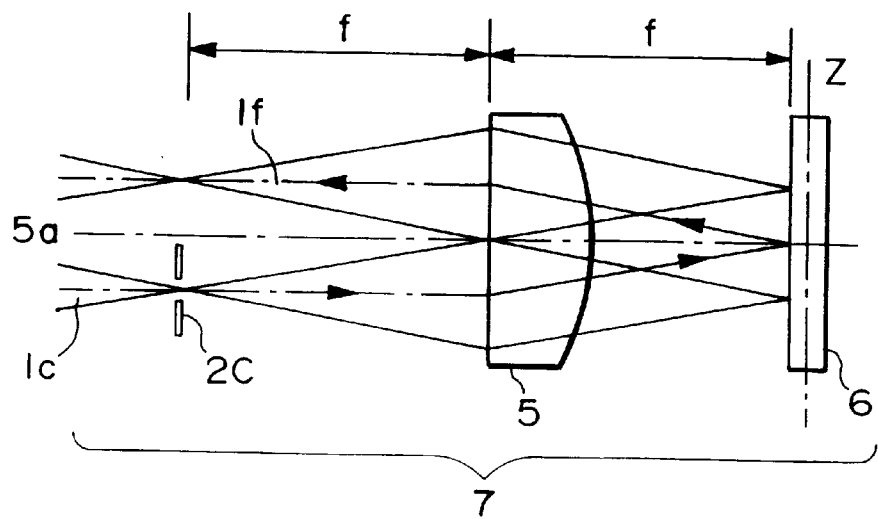
FIG. 9 is a drawing showing the return reflection means provided in the double pass monochromator of the fifth embodiment.
Figure 11:
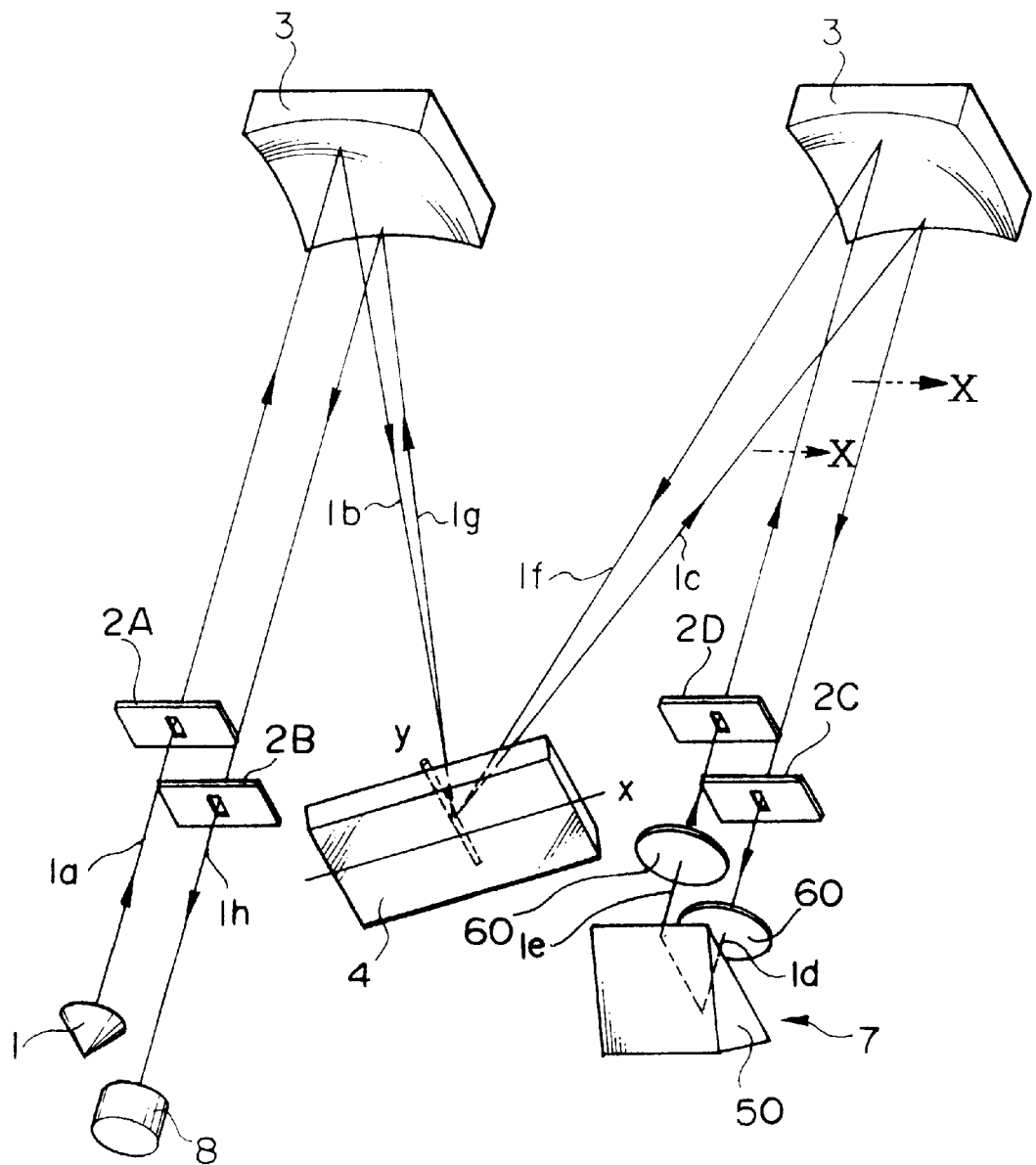
FIG. 11 is a drawing showing the structure of a conventional double pass monochromator.
Figure 12:
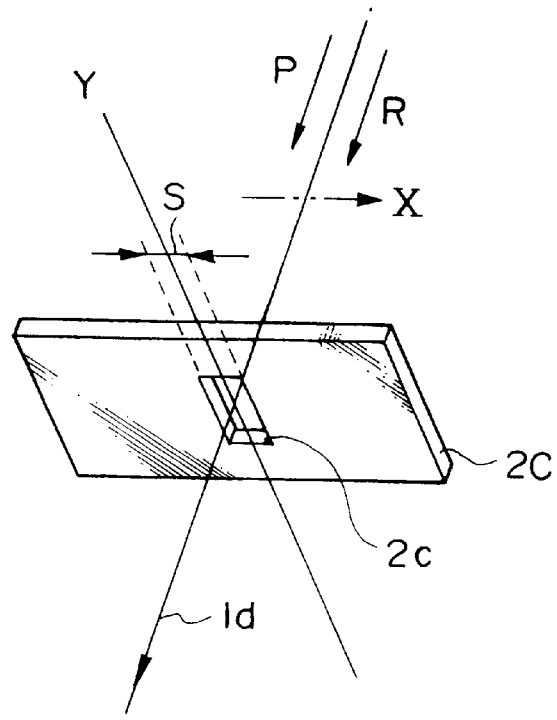
FIG. 12 is a drawing for explaining the dispersion direction of the light in the middle slit and the direction perpendicular to this direction of the dispersion.
Figure 13:
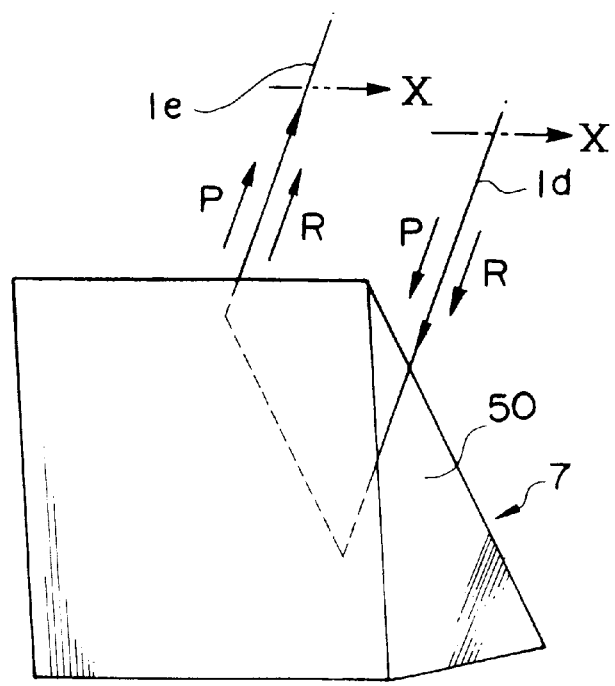
FIG. 13 is a drawing showing the return reflection means provided in the conventional double pass monochromator shown in FIG. 11.

FIG. 8 is a drawing showing the structure of the double pass monochromator of the present embodiment. The double pass monochromator shown in FIG. 8 comprises a light source 1 that produces the light measured by this double pass monochromator, the entrance slit 2A, the lenses 3A, 3B, the diffraction grating 4, the return reflection means 7 comprising the middle slit 2C, the collimator lens 5, and the planar mirror 6, the planar mirror 9, and the final exit slit 2B, When carrying out dispersion with the double pass monochromator of the present embodiment, like the conventional double pass monochromator, after carrying out the first diffraction and the second diffraction, the light is outputted as output light 1h. As shown in FIG. 9, in the return reflection means 7, the optical axis 5a of the collimator lens 5 differs in height from the central line of the first pass emitted light 1c diffracted by the diffraction grating 4. Because of this, the incident light on the collimator lens 5 transits the lower side (or upper side) of the optical axis of the collimator lens 5 to become a parallel beam, and is reflected by the planar mirror 6. The reflected light of the planar mirror 6 again transits the upper side (or lower side) of the collimator lens 5, and becomes the return reflected light 1f.

In the return reflection means 7 formed by the collimator lens 5 and the planar mirror 6 in this type of double pass monochromator, the collimator lens 5 is disposed at a position that changes only in the direction of the axis of rotation (y) of the diffraction grating 4 with respect to the central line of the first pass emitted light 1c refracted by the diffraction grating 4, and by being reflected in the planar mirror 6, the dispersion direction X of the return reflected light 1f is reversed during the reflection by the return reflection means 7. In addition, as shown in FIG. 10, the angle of the incident and emission light when separated into spectral components by the diffraction grating 4 can be made to be identical during the first and second diffraction.

When separating the spectral components in the double pass monochromator, by reflecting the light in the return reflection means 7, the dispersion direction X of the light is reversed, and it becomes the return reflected light 1f, and because it is further diffracted by the second transit of the monochromator, the wavelength resolution can be increased.

In addition, in the return reflection means 7 of this double pass monochromator, the angle of the incident and emission light when separated into spectral components by the diffraction grating 4 is identical during the first and second diffraction, and thereby it is possible to make the first pass wavelength in the monochromator and the second pass wavelength in the monochromator agree over a wide wavelength range. Thus, complicated control, such as vertically moving the middle slit 2C and the exit slit 2B, is unnecessary, and the structure can be simplified.

The wavelength resolution $\Delta\lambda$ in the double pass monochromator in FIG. 8 is expressed by the following equation:

$$\Delta\lambda = (d/(2m \cdot f)) \cdot S \cdot \cos \beta \qquad (iii)$$

Here, d is the distance between the grooves in the diffraction grating, m is the order of diffraction, f is the focal distance of the collimator lens, S is the width of the slit, and $\beta$ is the angle formed by the light reflected by the diffraction grating and a normal line of the diffraction grating.

In this double pass monochromator, because the dispersion direction X of the return reflected light obtained by the return reflection means 7 is reversed, seen from the diffraction grating 4, the dispersion direction X of the first pass emitted light and the second pass incident light are opposite, and the separation into spectral components during the second pass is more finely diffracted. At this time, if the angle formed by the first pass reflected light of the diffraction grating 4 and the normal line of the diffraction grating 4, and the angle formed by the second pass reflected light of the diffraction grating 4 and the normal line of the diffraction grating 4 are identical, then the formula for wavelength resolution (iii) holds.

According to equation (iii), this double pass monochromator can realize a monochromator just like one having double the focal distance, but without extending the focal distance f of the collimator lens. That is, because the dispersion direction X of the light is reversed by the return reflection means 7, it is possible to increase the wavelength resolution without extending the focal distance of the collimator lens.

In addition, in the return reflection means 7, because the planar mirror 6 is disposed at the focal position separated from the collimator lens only by the focal distance of the collimator lens 5, the light incident on and emitted from the return reflection means 7 can be maximally separated in the horizontal direction without being attenuated. Thereby, it is possible to eliminate stray light, and possible to increase the dynamic range. In addition, this double pass monochromator increases the selectivity of the wavelength by being diffracted two times, and at the same time, because it has a middle slit provided, it is possible to eliminate stray light by this middle slit, and possible to increase the dynamic range.

When the photo detector 8 is provided at the incident side of the light, the Littrow light reflected in the same direction as the incident light incident on the monochromator incurs the problem of worsening the stray light. However, because the return reflection means 7 of the double pass monochromator in FIG. 8 separates the light in the direction (y) perpendicular to the dispersion direction X, the height of the light path of the incident light incident on the monochromator and the height of the light path of the emitted light output from the monochromator are different. That is, in the photo detector 8, the dynamic range can be increased because it is not easily influenced by Littrow light due to the incident light.

In the double pass monochromator of the present embodiment, it is possible to replace the lenses 3A, 3B, as in the example shown in FIG. 1, with a concave mirror 3. In addition, in the double pass monochromator of the present embodiment, the optical arrangement of the Czerny-Turner type shown in FIG. 8 can be made a Littrow-type. Furthermore, in the above-described double pass monochromator, the middle slit 2C can be disposed either before or after the reflection by the return reflection means 7, or both before and after the reflection. In addition, in the double pass monochromator of the present embodiment light can be incident on the monochromator via the incident slit 2A shown in FIG. 8, but an optical fiber can be used instead of the entrance slit 2A.

What is claimed is:

1. A double pass monochromator for receiving incident light and outputting output light having a particular wavelength, the monochromator comprising:

a diffraction grating;

a return reflection means, wherein the incident light is directed from the diffraction grating to the return reflection means in a first pass and a first diffraction, and is then reflected by the return reflection means back to the diffraction grating in a second pass and second diffraction, and wherein the return reflection means reverses the direction of dispersion of the wavelength of light during the said reflection.

2. A double pass monochromator according to claim 1 wherein said return reflection means makes the angles of the incident and emitted light (1b, 1c, 1f, 1g) with respect to the grating surface of said diffraction grating (4) identical in the first diffraction and the second diffraction when separated into spectral components by the diffraction grating (4).

3. A double pass monochromator according to claim 1, wherein the diffraction grating is rotatable and wherein said return reflection means (7) eliminates fluctuation that is perpendicular to the direction of dispersion of light and produced by rotation of said diffraction grating (4).

4. A double pass monochromator according to claim 3, wherein said return reflection means (7) makes identical during reflection the components of the light (1d) that are incident on the return reflection means (7) and are in a direction perpendicular to the direction of dispersion of the wavelength and the components of the light (1e) reflected and emitted by the return reflection means (7) that are in a direction perpendicular to the direction of dispersion of the wavelength.

5. A double pass monochromator according to claim 1, wherein light passes through the monochromator in first and second transits and wherein said return reflection means (7) eliminates during the second transit of the monochromator the aberration of light produced during the first transit of the monochromator.

6. A double pass monochromator according to claim 5 wherein said return reflection means (7) reflects the light an odd number of times.

7. A double pass monochromator according to claim 1 wherein said return reflection means (7) comprises:

a middle slit (2C) that passes a particular wavelength component among those of the first pass emitted light (1c) from said diffraction grating (4);

a collimator lens (5) that transforms the light that transited the middle slit into a parallel beam; and a planar mirror (6) that reflects said parallel beam towards the diffraction grating (4) via said collimator lens (5); and wherein the optical axis of said collimator lens (5) moves parallel to the grating direction of said diffraction grating (4) with respect to the center line of said first pass emitted light (1c).

8. A double pass monochromator according to claim 7 wherein said planar mirror (6) is disposed on the optical axis of said collimator lens (5) and at the focal point position thereof.

9. A double pass monochromator according to claim 1, further comprising an entrance slit (2A) that restricts the source incident light (1a) and an exit slit (2B) that restricts the output light, the slits being mounted independently.

* * * * *